Patented May 15, 1945

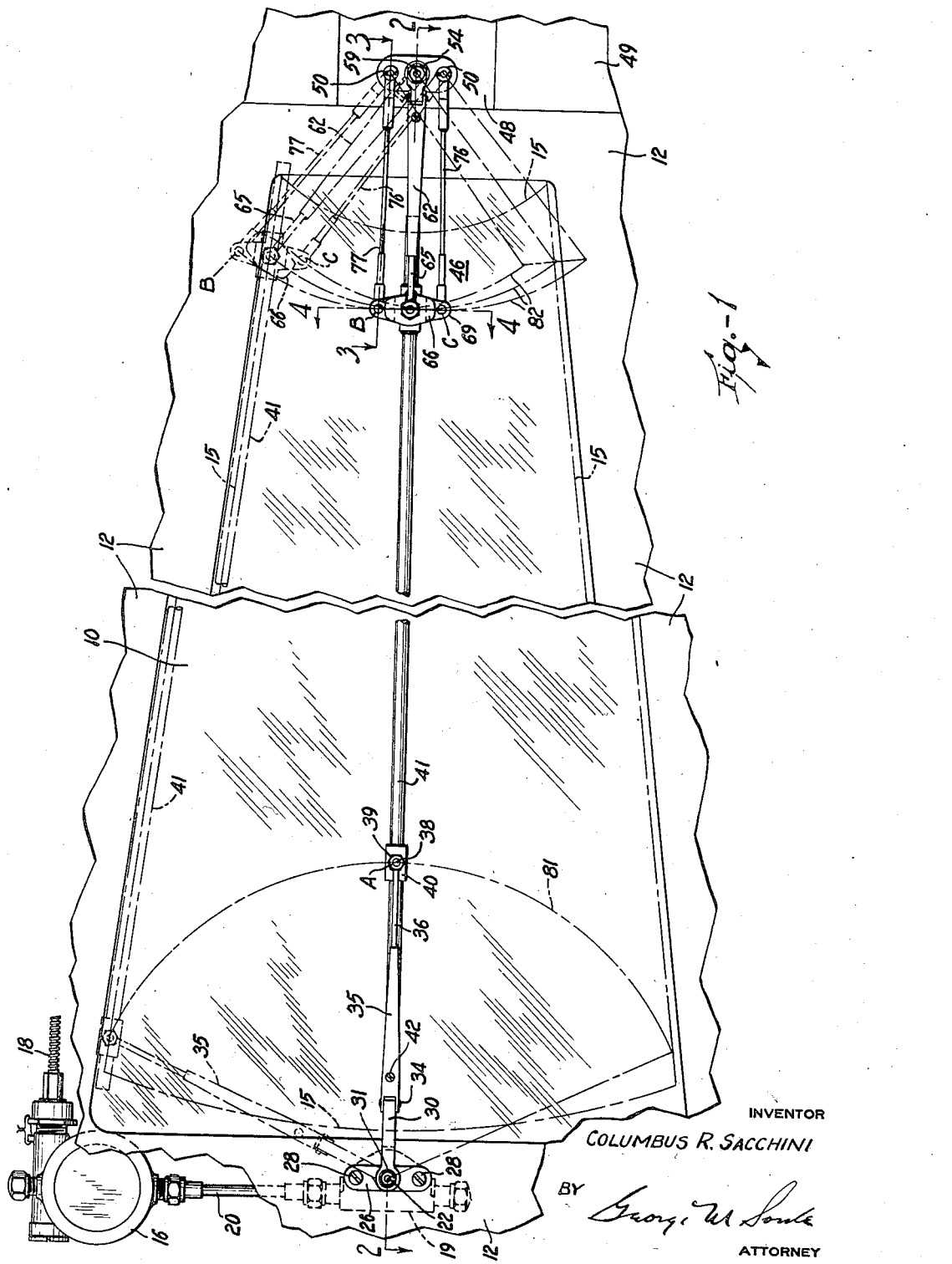

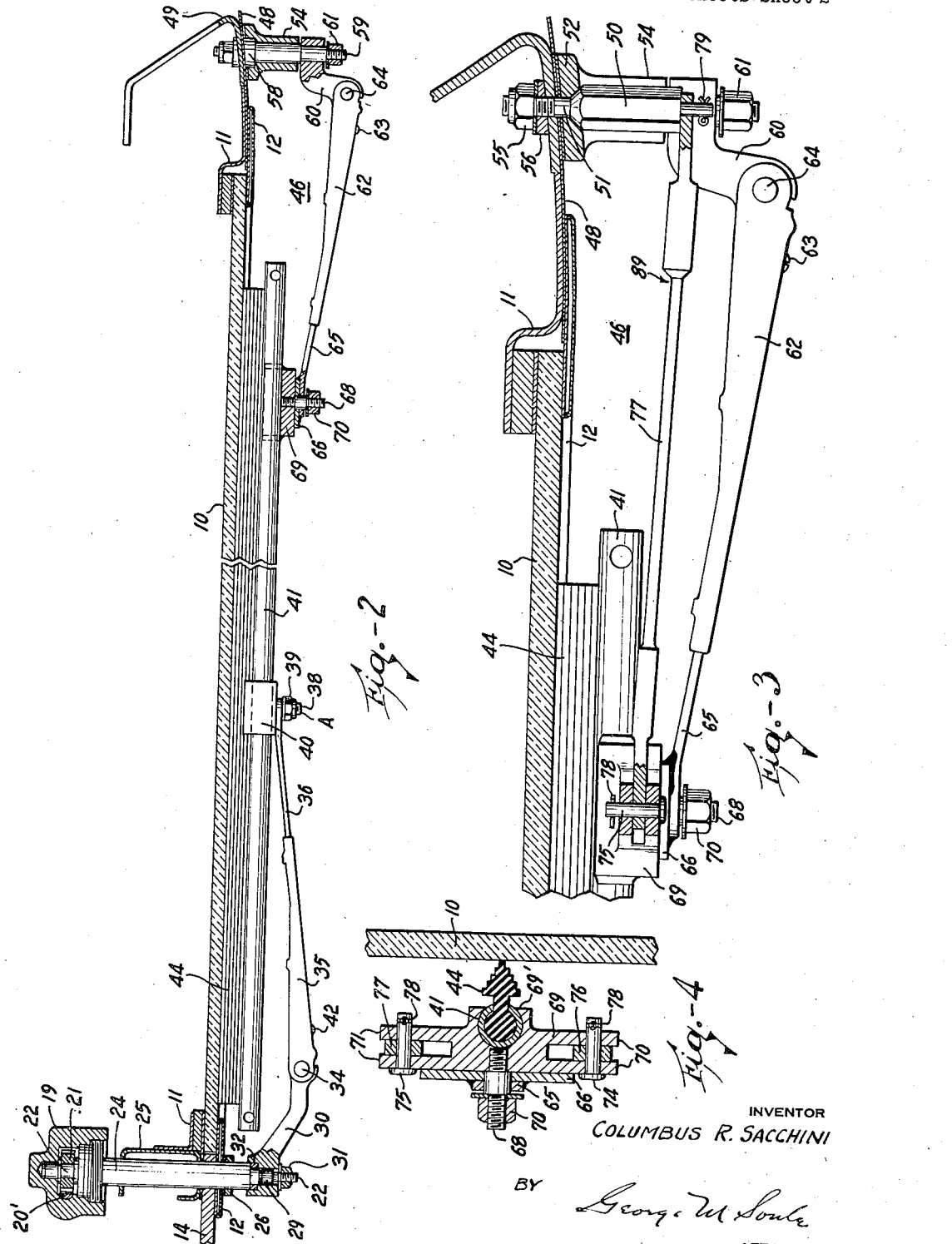

2,376,013

UNITED STATES PATENT OFFICE 2,376,013

MOTION EFFECTING MECHANISM

Columbus R. Sacchini, Euclid, Ohio, assignor to The Marquette Metal Products Company, Cleveland, Ohio, a corporation of Ohio Application July 23, 1943, Serial No. 495,836

7 Claims. (Cl. 15—253)

This invention relates to a mechanism for imparting oscillatory or reciprocating lateral motion to an elongated member. Although the invention has many applications, it is described and claimed herein as used in the operation of a blade or cleaning element of a window or windshield wiping apparatus.

In many modern vehicles, and notably in large aircraft, it is necessary to maintain extensive window or windshield surfaces free of all matter tending to obscure vision. Heretofore, increasingly large window areas have usually been cleared merely by providing enlarged window wiping apparatus of the usual type in which a wiper blade, supported and pivoted at one point, is caused to sweep across the window surface in an area defined by concentric circular arcs.

Since most large windows or windshields of vehicles are non-circular, an obvious disadvantage in the use of commonly used window wiping mechanism, regardless of their size, is that the annular characteristic of the area swept by the blade does not conform to the shape of the window and thus is inherently considerably less than the total area of the window so that a large part of the vision surface remains outside of the path of the wiper blade. That disadvantage of the usual windshield wiper mechanism is encountered especially in the application of the mechanisms to military aircraft where good visibility in all directions in all kinds of weather is of great importance.

Another disadvantage of the usual window or windshield wiping apparatus operated by an oscillating shaft is that, due to the fact that the wiper blade is supported at a single point along its length, there is a practical limit to the total area that can be swept by a single blade. If the blade is lengthened in order to increase the working area, the unsupported portions of the blade flex and vibrate to such an extent that the cleaning function is impaired. Increasing the cross-section of the blade in an attempt to avoid this obvious consequence of increased size results in the moving parts becoming so heavy that too much power is required for operation.

Although a plurality of window wiping mechanisms have been used to clean larger areas of single windows than it has heretofore been possible to clean with single units of increased size, the use of more than one unit per window results in installations of undue complexity, and, since the area swept by each blade is a portion of an annulus, only surfaces bounded by circular arcs can be completely cleared.

In accordance with this invention a motion converter mechanism is provided in which an elongated member, such as the blade of a window or windshield wiping mechanism, is supported at both ends and is driven back and forth laterally by a single oscillating shaft. Since the blade is supported at both ends, it can be much longer than the blades of conventional wiper mechanisms, the form shown in the drawings being designed to drive a blade over forty inches in length; and, since the blade moves laterally instead of swinging about a fixed pivot, substantially rectangular areas are swept by the blade so that almost the entire areas of rectangular or trapezoidal windows or windshields are cleaned. In addition to being adapted for use in clearing large vision surfaces, the mechanism of this invention meets all of the many requirements unique in aircraft installations of this type such as ruggedness, great reliability, high efficiency, and light weight, and the mechanism occupies but little more essential space than prior windshield wipers designed for cleaning much smaller areas. Furthermore, the unit is particularly adapted for use in cleaning windows which face generally downwardly such as bombardier's windows, which application requires that the blade be kept against the vision surface in opposition to the force of gravity.

An object of this invention is to provide an improved motion effecting mechanism.

Another object is to provide an improved motion effecting mechanism capable of converting alternate rotary motion into lateral reciprocating motion.

A further object is to provide a window or windshield wiper mechanism which meets the requirements discussed above and which has none of the disadvantages discussed.

A correlative object is to provide a window or windshield wiper mechanism the blade of which sweeps across a generally rectangular or trapezoidal area.

A more specific object is to provide a window or windshield wiping mechanism in which the wiper blade is supported near both ends though driven at but one end and in which the wiper blade sweeps across a generally rectangular area.

Other objects and advantages will become apparent from the following description of the illustrative form shown in the drawings, in which Fig. 1 is a bottom plan view of the invention shown in cooperative relation with a bombardier's window; and Figs. 2, 3 and 4 are sectional views taken at 2—2, 3—3 and 4—4, respectively of Fig. 1.

Referring further to the drawings, 10 is a representative window or windshield panel of suitable transparent material supported as in a horizontal position by inner and outer frame assemblies 11 and 12, respectively. Although the panel 10 could be of any convenient geometrical configuration, it is illustrated as trapezoidal and in a horizontal position and is thus similar to the bombardier's window currently in use on many large bombers. The frame assemblies 11 and 12 may also support abutting panels, one such being shown at 14 in Fig. 2.

The surface area of the panel 10 that is swept by the wiping apparatus to be described is enclosed within the dot and dash line 15 of Fig. 1 and constitutes substantially the entire area of the panel 10 inside of the frame assemblies 11 and 12.

Supported in any suitable manner above the panel 10 and near the inner frame assembly 11 at its wider end (shown as the left end in the drawings) is a motion converter unit 16 which receives power from a continuously rotating, flexible shaft assembly 18, and which transmits power to a window drive unit 19 through a reciprocating (push-pull) power take-off shaft assembly 20. The end of the power take-off shaft 20' (Fig. 2) which enters the window drive unit 19 has a rack portion continuously in mesh with a pinion 21 keyed to a power output shaft 22 of the window drive unit 19. The continuously rotating shaft of the assembly 18 thus drives the shaft 22 with alternate rotary motion as a result of the operation of the motion converter 16 and the window unit 19.

The window drive unit 19 is supported by an elongated cylindrical bushing 24 passing through an opening in the wall or panel 14 and secured above the panel 14 by a C-shaped section 25 of the inner frame assembly 11 and on the lower side by a mounting plate 26 attached by screws 28 to the lower frame assembly 12. The shaft 22 is rotatably supported within the bushing 24 and has a splined or fluted portion 29 which is received within a complementary opening in a crank arm 30 so that the arm 30 is positively driven with oscillatory motion by the shaft 22. The arm 30 is held in position on the shaft 22 by a nut 31 threaded on the lower end of the shaft 22, and a seal member 32 received within a counterbored portion of the splined opening in the arm 30 is compressed by the lower end of the bushing 24 to prevent any leakage of lubricant.

Suitably pivoted at 34 on the crank arm 30 is a wiper drive arm 35 having a flexible axial extension 36 rotatably secured at its outermost end as by a stud 38 and nut 39 to a guide member or saddle 40 which is slidable upon and almost completely surrounds a longitudinally slotted tubular wiper blade support or backing 41. The pivot point between the drive arm 35 and the saddle 40 is designated generally by the character A. An adjusting screw 42 threaded into the drive arm 35 bears against the crank arm 30 near the outermost end thereof to provide means for adjusting the angle between the arms 30 and 35, hence the pressure of the blade against the window. The wiper blade 44 may be of conventional design and is held in position by having a cylindrical portion fitted within the tubular support 41 as best shown in Fig. 4.

For supporting and guiding the end of the wiper blade 41 remote from the collar 40 (right end in the drawings) a linkage mechanism indicated generally at 46 is provided. The mechanism 46 is attached to a body panel 48 of the vehicle which panel is suitably secured to a structural member 49 and also forms the support for the upper and lower frame assemblies 11 and 12.

The mechanism 46 includes a pair of pivot posts 50 indicated as hexagonal in cross section. Reduced threaded end portions 51 of the posts pass respectively through spaced openings in a flange portion 52 of a tubular pivot bracket 54 and through complementary spaced openings in the panel 48 and member 49. The pivot posts 50 are retained in position by respective nuts 55 (only one of which is shown in Fig. 3) screwed on the upper threaded ends of the posts and spaced from the member 49 as by leveling spacers 56. The bracket 54 is thus secured to the panel 48 by the pivot posts 50 and the openings in the flange portion 52 are conically countersunk to receive complementary conical portions of the posts 50.

The opening in the tubular portion of the pivot bracket 54 is countersunk at its upper end to receive an integral collar portion 58 (Fig. 2) of a main pivot bolt 59 upon a lower reduced end portion of which is rotatably secured an S-shaped crank arm or wiper arm head section 60 of a wiper arm 62 as by a nut 61 threaded on the extreme lower end of the pivot bolt 59. The wiper arm 62, generally similar to the wiper drive arm 35, is suitably pivoted at 64 to the section 60 and has a flexible axial extension 65 which is suitably secured, as by welding, at its outermost end to a bearing plate 66. A screw 63 functions in the manner of the screw 42 to provide for adjustment of the angle between the arm section 60 and the wiper arm 62.

The bearing plate 66 is rotatably received on an enlarged portion of a stud 68 screwed into a blade guide 69, somewhat similar to the saddle 40 but fixed to the blade support 41, and is held in sliding contact with the lower face portion of the blade guide 69 by a nut 70 threaded on the lower end of the stud 68. The wiper blade support or backing 41 is received within a partially closed cylindrical slot 69' (Fig. 4) in the upper face of the guide 66. The guide 66 has opposed bifurcated arms 70 and 71 within which extend pivot pins 74 and 75, respectively, rotatably supporting—between the bifurcations—the ends of guide rods 76 and 77, respectively. The pivot pins 74 and 75 are retained in position by suitable cross pins 78. The pivot points thus defined between the guide rods 76 and 77 and the blade guide 66 are designated in Fig. 1 as B and C, respectively.

The other ends of the guide rods 76 and 77 are pivoted respectively upon lower reduced end portions of the pivot posts 50 and are held in position by suitable cross pins 79 (Fig. 3). The guide rods 76 and 77 may be of fixed length or may be made of adjustable (normally fixed) length by means of a threaded joint indicated by the two different diameters at 80.

In operation, the force of the alternately rotating shaft 22 is transmitted to the tubular and nearly rigid wiper blade support 41 at the pivot point A by the crank arm 30 and wiper drive arm 35 and causes the left end of the support 41 to move laterally (vertically as shown in Fig. 1). The saddle 40 slides along the support 41 while traveling in the circular arc indicated by a dot and dash line 81. The force causing movement of the support 41 is, of course, tangential to the arc 81. Assume, in accordance with the principles of mechanics, that the guide rod 77 (which forms a linkage of the mechanism 46) is held stationary and thus that the entire window wiping unit is in equilibrium. Under these assumed conditions the summation of moments about the pivot point B must be equal to zero. Thus the moment about the pivot point B due to the force at A must be accompanied by an equal and opposite moment. The force of said equal and opposite moment is impressed at the pivot point C and is tangential to an arc scribed by a line passing through the pivot points B and C as the line swings about the point B as a center. The force at C thus acts through a moment arm equal to the distance between the points B and C. Within the range of movement permitted by the oscillating shaft 22, the sum of the forces which cause the moments about the pivot point B at all times has a radial component tending to move the blade guide 69 toward the pivot bolt 59 and also has a component tending to move the blade guide 69 about the pivot bolt 59 as a center. The former of these two component forces, of course, can cause no movement, but the latter is at all times within the range of movement permitted by the extent of oscillation of the shaft 22 sufficient to drive the blade guide 69 along the arcs indicated by the dot and dash lines 82 of Fig. 1.

As the blade guide 69 moves in the circular arcs 82 it carries with it the blade support 41 and thus moves the right hand end of said support 41 laterally concurrently with the lateral movement imparted to said blade support 41 by the force at the pivot point A. During movement of the blade guide 69, the bearing plate 66 turns on the stud 68 and the guide rods 76 and 77 pivot at both ends as indicated by the dotted line view of Fig. 1.

Although in the foregoing force analysis the pivot point B was assumed stationary, a similar result is, of course, obtained if the pivot point C is assumed stationary.

An examination of Fig. 2 shows that because of the cooperative relation between the saddle 40 and the blade guide 69 with respect to the support 41, the wiper blade 44 is held securely against the panel 10. Since any axial force imparted to the support 41 by the saddle 40 is opposed by an opposite axial force imparted by the blade guide 69, there is no tendency for the wiper blade 44 to move axially. Consequently it would not be essential to fix the blade guide 69 to the support 41 and the ends of the blade could be made to move in straight lines rather than arcs if desired.

I claim:

1. In a motion effecting mechanism, means for converting continuously rotating motion into alternate rotary motion, a guide member, a positive drive connection to swing said member alternately in a circular path by said means, an elongated work performing member movable axially of itself with respect to said guide member and driven thereby, and a parallel linkage mechanism pivotally connected with the elongated member remotely of the guide member and constraining said elongated member to move laterally as said guide member moves in said circular path.

2. In a motion effecting mechanism mounted on a supporting structure, a pair of guide members pivotally carried by said supporting structure and at opposite ends of an area to be traversed by said mechanism, an elongated work performing member having respective end portions independently carried by said guide members, in one case slidably, positive drive means for causing reciprocation of one of said guide members in a circular path, and means constraining said other of said guide members to move in a circular path as a result of movement of said first guide member through the intermediary of the elongated member, whereby the elongated member moves to and fro laterally.

3. In a motion effecting mechanism mounted on a supporting structure, a pair of guide members pivotally carried by said supporting structure and at opposite ends of an area to be traversed by said mechanism, an elongated work performing member supported at opposite ends by said guide members, respectively, in one case slidably, positive drive means for effecting reciprocation of one of said guide members in a circular path, and means constraining said other of said guide members to move in a circular path as a result of movement of the elongated member by said first guide member.

4. In a motion effecting mechanism mounted on a supporting structure, a pair of guide members pivotally carried by said supporting structure and at opposite ends of an area to be traversed by said mechanism, an elongated work performing member having its respective end portions supported by said guide members, one slidably and pivotally supported, positive drive means for effecting reciprocating movement of said one of said guide members in a circular path, a swingable arm having a free end pivotally connected to the other of said guide members, a pair of swingable links having free ends pivotally secured to said other guide member on opposite sides respectively of the pivotal connection between said swingable arm and said other guide members.

5. In a motion effecting mechanism mounted on a supporting structure, a pair of guide members pivotally carried by said supporting structure and at opposite ends of an area to be traversed by said mechanism, an elongated work performing member having an end portion slidable within one of said guide members and another end portion pivotally supported by the other, positive drive means for effecting reciprocation of said one of said guide members in a circular path, an arm constrained to move about a fixed pivot and having a free end pivoted to said other of said guide members, a pair of linkages pivoted at opposite sides of said fixed pivot parallel thereto and having free ends pivotally connected to said other guide member on opposite sides respectively of the pivoted connection between said arm and said other guide members.

6. In a mechanism for producing reciprocating lateral motion of an elongated work performing member, means including a driving crank supporting one end of said member remote from the driving axis of the crank and arranged to move to and fro in a circular arc, a coupling means supporting the other end of said member, an idling crank swingable on a fixed axis and having its free end pivotally attached to said coupling means, a pair of guide rods pivoted parallel to said fixed idling crank axis and having their free ends pivotally attached to said coupling means on opposite sides respectively of the point of pivotal attachment between said idling crank and said coupling means.

7. In a motion translating mechanism, a pivotally mounted guide member reciprocable in a circular path, an elongated wiper member operatively connected to said guide member to be simultaneously driven thereby and bodily shiftable with respect thereto and pivotally mounted means connected with an opposite end portion of said elongated member to cause said member to move laterally upon movement of said guide member in a circular path.

COLUMBUS R. SACCHINI.